(No Model.)

J. KRINER.
FRUIT GATHERER.

No. 406,744.   Patented July 9, 1889.

Witnesses:
John Enders
H. E. Peck.

Inventor
Jeremiah Kriner,
per. O. E. Duff
Attorney

UNITED STATES PATENT OFFICE.

JEREMIAH KRINER, OF CARLISLE SPRINGS, PENNSYLVANIA.

FRUIT-GATHERER.

SPECIFICATION forming part of Letters Patent No. 406,744, dated July 9, 1889.

Application filed March 5, 1889. Serial No. 301,853. (No model.)

*To all whom it may concern:*

Be it known that I, JEREMIAH KRINER, of Carlisle Springs, in the county of Cumberland and State of Pennsylvania, have invented certain new and useful Improvements in Fruit-Gatherers; and I do hereby declare that the following is a full, clear, and exact description of the invention, which will enable others skilled in the art to which it appertains to make and use the same, reference being had to the accompanying drawings, and to the letters of reference marked thereon, which form part of this specification.

My invention relates to an improvement in fruit-gatherers.

The object of the invention is to provide an improved fruit-gatherer exceedingly cheap and simple in construction and formed of a minimum number of strong durable parts, and wherein the pole or supporting-rod of the gatherer is extensible. These objects are accomplished by, and my invention consists in, certain novel features of construction and combinations of parts, more fully described hereinafter and particularly pointed out in the claims.

Figure 1:
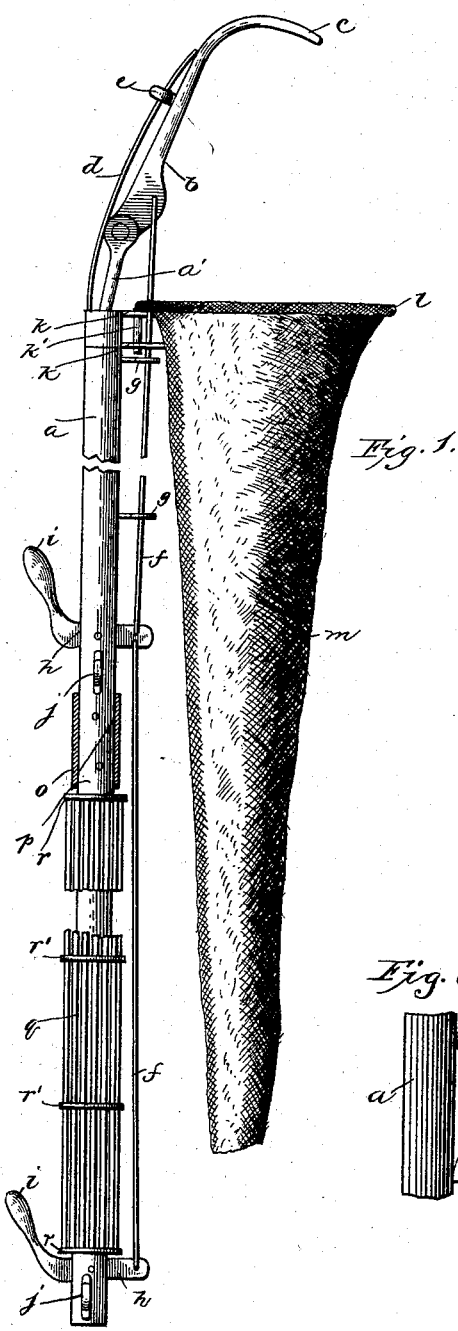
Figure 2:
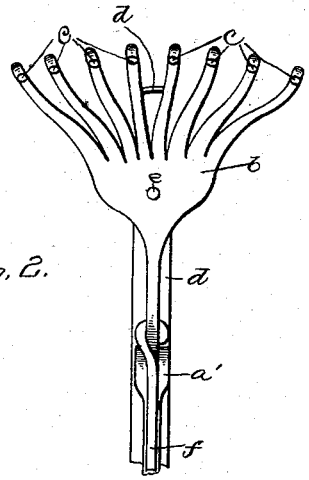
Figure 3:
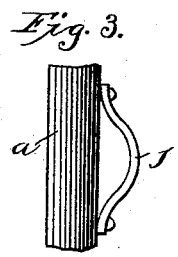

Referring to the accompanying drawings, Figure 1 is a side elevation of the device. Fig. 2 is a detail elevation of the claw or grip of the gatherer and upper end of the pole or rod. Fig. 3 is a detail of a stationary handle secured to the pole and showing a portion of the hole.

In the drawings, the reference-letter $a$ indicates a supporting rod or pole of a suitable length to reach into the tops of trees of the usual height. The upper end of this pole is provided with a metallic cap having a pin $a'$, to which the lower end of a picking-claw $b$ is hinged to swing in a vertical plane. This claw is preferably formed of one piece of metal, and the lower end, as above mentioned, is pivoted in the forked upper end of pin $a'$. From its pivoted end the claw increases in width and is provided with a series of upwardly and laterally projecting fingers $c$, said fingers also curving forwardly, as shown, so that the free ends of the fingers will be located in a plane or planes at or nearly at right angles to the base of the finger, thus forming a flaring upwardly and forwardly curving claw with the spaces between the fingers gradually decreasing in width to the base of the same. A plate-spring $d$ is secured at its lower end to the upper end of the rod $a$, and from thence extends upwardly at the rear side of the claw and passes loosely through a staple $e$, secured to the claw to yieldingly and normally hold the claw in its upright position. The claw is operated or drawn forwardly against the tension of said spring to grasp and pick the fruit by means of a rod or wire $f$ at its upper end, loosely secured to the front lower portion of the claw above its pivoted point and extending down to the lower end of the pole through suitable eyes or staples $g$, and at its lower end secured to the free end of a lever $h$, extending through and pivoted in the supporting-pole, and preferably having its handle end $i$ upon the opposite side of the pole, so that when the handle $i$ is drawn in toward the periphery of the pole the claw will be pulled forwardly and down. Near the operating-lever $h$ the pole is also provided with a handle $j$, by means of which the pole can be easily held or moved.

The upper end of the pole on its front side is provided with one or more plates or brackets $k$, provided with transverse apertures or openings to receive hooks or arms $k'$, secured to the funnel or ring $l$, supporting and holding open the upper end of the fruit-receiver or flexible conveying-tube $m$, which extends to or near the ground. The upper open mouth of the conveying-tube is held beneath the claw by the hooks of the ring $l$ engaging the brackets, and when the claw is operated it draws the fruit down to the mouth of the tube and breaks off the same. The fruit then passes down through the tube.

The pole $a$, as shown in the present case, is made in two or more sections, removably spliced together by having their meeting ends beveled and surrounded by a sleeve $o$, removably secured to said sections, as by pins. The lower end of the upper section of the pole is provided with the operating-lever and a handle, as before mentioned, so that the pole can be used without the lower section, and said lower section $p$ at its lower end is also provided with an operating-lever $h$ and a handle $j$, and when the lower section is used the lever of the same is connected with the wire *f*, as shown. This lower section is strengthened and braced to prevent bending by a series of wires *q*, longitudinally located around the periphery of the same, and at their ends rigidly secured to circular end plates *r r*, rigidly secured to and carried by said lower extension or section, and said wires also pass through circular plates *r′ r′*, secured to said section between the circular end plates.

The operation of the device is obvious from the foregoing description and the drawings.

What I claim is—

1. In a fruit-picker, the combination of the pole, a picking-claw pivoted at its lower end to and extending above the upper end of the pole, said claw consisting of a body portion and a series of diverging fingers extending upwardly from said body and curving forwardly at their upper ends, a connection loosely secured to said claw above its pivoted end and extending downwardly along the pole to draw the claw down, and a spring secured to the pole and connected to said claw to yieldingly hold the same in its normal upright position, substantially as described.

2. In a fruit-picker, the combination of the pole, a picking-claw formed integral and consisting of a body portion pivoted to the upper end of the pole to swing forwardly and having a series of diverging fingers extending upwardly and curving forwardly at their free ends, a plate-spring at one end secured to the pole and extending upwardly and connected to said claw to yieldingly hold the same in its normal position, and a rod or connection to draw the claw downwardly, substantially as described.

3. The combination, with the pole, a picking-claw hinged to the upper end of the pole, and a rod or connection connected to the claw and extending longitudinally of the pole, of an operating-lever extending transversely through and pivoted in the pole and loosely secured to said connection at one end, and a stationary handle secured to the pole near said operating-lever, substantially as described.

4. The combination of the pole, a cap on the upper end of the pole having an upwardly-extending bifurcated pin, a picking-claw consisting of a body portion having its lower end pivoted in said pin and a series of diverging picking-fingers, a spring secured to the rear side of the claw to yieldingly hold it in position, and a rod connected to its front side to draw the claw down, substantially as described.

5. In a fruit-picker, the combination of the pole, and lateral perforated brackets secured to the upper end of the pole, with a flexible conveyer or tube, and a ring by which the same is supported and its upper end held open, said ring being provided with a hook removably located in the perforation of said brackets, substantially as described.

6. A fruit-picker comprising a pole made in two sections removably secured together by a sleeve and pins, a series of wires around the lower section and longitudinally located on and secured to the same to prevent bending, and a picker carried by the pole, substantially as described.

In testimony that I claim the foregoing as my own I affix my signature in presence of two witnesses.

JEREMIAH KRINER.

Witnesses:
MILLARD F. THOMPSON,
A. A. THOMSON.